Patented Sept. 7, 1948

2,448,791

UNITED STATES PATENT OFFICE 2,448,791

PRODUCTION OF PENICILLIN IN COTTON-SEED MEAL MEDIUM

Jackson W. Foster, New York, N. Y., and Lloyd E. McDaniel, Rahway, N. J., assignors to Merck & Co., Inc., Rahway, N. J., a corporation of New Jersey No Drawing. Application January 22, 1946, Serial No. 642,748

12 Claims. (Cl. 195—36)

This invention relates to a new and improved process for the production of antibiotics. More particularly it is concerned with a new and improved procedure, utilizing a novel nutritive medium, for the production of penicillin.

This application is a continuation-in-part of our copending patent application Serial No. 487,140, filed May 15, 1943.

In our copending application we have disclosed an improved procedure for the production of penicillin by the growth, under submerged conditions, of a penicillin producing strain of Penicillium such as *Penicillium chrysogenum* or *Penicillium notatum*. Various nutritive media are disclosed in said copending application as suitable for the propagation of the Penicillium strain. The invention herein disclosed is directed to an improved process for the production of penicillin by submerged growth of a penicillin producing strain of Penicillium utilizing, as an ingredient of the nutrient medium, one of the materials disclosed in our copending application as suitable, i. e., cottonseed meal.

Throughout this application where the term penicillin is used, it is intended to define that anti-bacterial substance produced by molds belonging to the genus Penicillium when the pH of the medium is near the neutral point or on the alkaline side, the properties of which substance have been described by Abraham et al. (Lancet, 241, 177–89, 1941; and Br. Jr. Exp. Path., 23, 103–120, 1942); as distinguished from the different principle isolated and described by Coulthard et al. (Nature, 150, 634–35, 1942); and Roberts (Jr. Biol. Chem., 147, 47–58, 1943), and which is formed by molds belonging to the genus Penicillium when the medium remains fairly acid, in the range of approximately pH 3.0 to 5.0.

The processes hitherto known for the production of penicillin, other than that disclosed in our above-identified copending application, involve the stationary surface-pad type of growth of *Penicillium notatum* in shallow layers of media. Such surface-pad stationary processes are disadvantageous for large-scale commercial operations.

We have now discovered a method whereby penicillin is produced by penicillin-producing strains of Penicillium, the microorganism being propagated under submerged conditions in a nutritive medium which contains cottonseed meal. In addition to cottonseed meal there may be present in the nutrient medium a nutrient mineral salt and a source of carbon and energy assimilable by penicillin-producing strains of Penicillium including carbohydrates, glycerol, and mixtures of the same. An agent to stimulate penicillin formation, such as phenylacetylethanolamine, may also be present.

In producing penicillin with our improved nutritive medium under submerged conditions, employing aeration, or aeration together with mechanical agitation, the pH of the aqueous medium in which the penicillin-producing organism is propagated is maintained under neutral or alkaline conditions, i. e., pH values falling within the range 6.0 to 8.5. We have found that under such pH conditions, the microorganism being grown submerged, there is achieved a luxuriant growth of the mold much more rapidly than in cultures of the stationary surface type. Moreover, the organism grows homogeneously throughout the body of the liquid medium, in the form of small discrete colonies, and larger or smaller pieces of vegetative mycelium. The rate of penicillin formation is markedly accelerated under submerged conditions utilizing our improved nutrient medium, and maximum penicillin formation is attained in a shorter period of time than is required for stationary surface growth conditions (from 2 to 6 days as compared with the 7 to 14 days, or longer, required under stationary surface growth conditions).

The aeration, or aeration and agitation, utilized during the propagation of the penicillin-producing microorganism, in accordance with our process, can be secured by means of any method or device, or combinations of devices, which ensure adequate solution of air throughout the medium. For example, air may be passed through the depth of medium in a deep tank, having been introduced into the tank through a simple pipe opening. Adequate solution of air may be secured by mechanical agitation, for example, by propellers or a turbo-mixer, or the solution of air can be achieved by passing it through a sparger or similar device which distributes the air so that a larger air surface is presented to the growing cells suspended in the medium. In the latter case the mechanical agitation may be reduced or eliminated altogether, passage of the air through the liquid being sufficient to provide adequate agitation for successful operation of the process.

We have found that the use of cottonseed meal as a nutrient medium for the submerged growth of penicillin-producing organisms utilizing aeration, or aeration and agitation, results in several important advantages in our improved process. First the pH of the cottonseed meal broth containing added nutrients in which the penicillin-producing organism is grown tends to remain fairly constant over the entire period of penicillin production. This is to be contrasted with other available nutrient media, such as the medium containing corn steep liquor, which has a definite tendency to increase in alkalinity during fermentation, to a pH of 8–8.5, or even higher. Penicillin is less stable under alkaline conditions and, with nutrient media other than cottonseed meal, this tendency to increase in alkalinity during fermentation has necessitated reducing the growing period, thereby producing a nutrient medium of lowered penicillin content. By utilizing cottonseed meal as the primary constituent of the nutrient medium greater uniformity in pH during the growing period is maintained, thereby avoiding the development of high pH values during fermentation. It is therefore possible to prolong the growing period, thereby securing maximum penicillin content in the nutrient medium.

Another advantage of the cottonseed meal medium over other available nutrient media, such, for example, as corn steep liquor, is that there is but little foaming of the cottonseed meal medium under production conditions. With some media, such, for example, as media containing corn steep liquor as the primary nutrient, foaming becomes so marked as to require reducing the air supply during fermentation. This results in reduced growth and lessened penicillin content in the nutrient medium. If foaming-over occurs contamination results, and the process utilizing cottonseed meal as a nutrient medium possesses distinct advantages in that the tendency toward foaming is very much reduced.

We have found, moreover, that the penicillin-producing organism grows more rapidly in the new nutrient medium utilizing cottonseed meal as its essential element than it does in other available nutrient media, such as the usual corn steep liquor medium utilized to some extent in commercial production. The broth has a higher penicillin potency per unit of volume than with other nutrient media. Moreover, the activity of the extracted penicillin is usually higher when cottonseed meal has been utilized in the nutrient medium than is characteristic of penicillin manufactured with corn steep liquor as the principal nutrient source, which would indicate that the associated impurities are either less in the cottonseed meal medium, or that their nature is such that they are rapidly eliminated during the extraction procedure wherein penicillin is extracted from the nutrient broth.

In making up media for growing penicillin-producing microorganisms, such as *Penicillium notatum* or *Penicillium chrysogenum*, in accordance with our invention, an aqueous medium containing cottonseed meal and a carbohydrate, together with various salts such as sodium nitrate, calcium carbonate, ammonium phosphate, magnesium sulfate, zinc sulfate, etc., is prepared. This is inoculated with a culture of the penicillin-producing organism which may be a specific strain of Penicillium such as *Penicillium notatum* NRRL 832; *Penicillium chrysogenum* Demerec X1612; or *Penicillium chrysogenum* Wisconsin Q176 (Backus and Stauffer 1945). The microorganism is grown in the cottonseed meal broth under submerged conditions at about 25° C. with aeration, or agitation and aeration, for a period of time. At the end of this period the penicillin is extracted from the broth by the use of any suitable solvent such, for example, as amyl acetate.

Various commercially available varieties of cottonseed meal have been tried out and all have been found equally satisfactory. Cottonseed meal, either before or after removal of the cottonseed oil, has been found equally satisfactory. In general, concentrations of the cottonseed meal in the nutrient medium ranging from 0.5% to 6% have been found effective.

Among supplementary sources of carbon and energy dextrose, lactose and brown sugar are all satisfactory carbohydrates. A supplementary nitrogen source, such as sodium nitrate, may also be included in the nutrient medium. The concentration of sugar present in the medium may be varied over rather wide limits such, for example, as from 0.25% to 5% by weight, based on the weight of the medium. The starch which is present in cottonseed meal and also added starch may also serve as a readily available energy source for the microorganism. The natural content of minerals in the cottonseed meal is usually sufficient for growth and penicillin production, thus permitting the elimination, if desired, of the added nutrient salts of that type disclosed, for example, in our previously referred to copending patent application.

Moreover, it is not essential to utilize in the nutrient medium special stimulating chemicals of the phenylacetyl derivative type (Pratt and Dufrenoy, 1945). The stimulating effects of derivatives of this sort such, for example, as phenyl-acetylethanolamine, is much less in cottonseed meal medium than it is in other media now utilized commercially such as those containing corn steep liquor. Apparently corn steep liquor is deficient in factors tending to permit the production of penicillin, and phenylacetyl derivatives or other stimulating agents are necessary in order to bring the level of penicillin production in media containing corn steep liquor up to that customarily secured in cottonseed meal media without the use of special stimulating chemicals.

As examples of our improved process for the preparation of penicillin by the growth of penicillin-producing organisms, and of media containing cottonseed meal for use in propagating the microorganisms under conditions wherein penicillin is produced in high yields, the following may be given. These examples give a number of details about specific nutrient media that may be employed, and they are to be regarded as illustrative of our invention and as not necessarily restrictive thereof.

*Example 1*

The superiority of nutrient media containing cottonseed meal, as compared with those containing corn steep solids for the production of penicillin may be illustrated by certain comparative tests the results of which are tabulated below.

Nutrient media containing corn steep solids, lactose and calcium carbonate were made up having the compositions noted in the table. One of these nutrient media, containing corn steep solids, also contained a phenylacetyl derivative as an adjuvant in the amount of 0.5 gram per liter.

Nutrient media were prepared, in accordance with our invention, containing cottonseed meal, these media having the compositions noted in the table. It will be observed that one of these media also contained a phenylacetyl derivative as adjuvant, in the amount of 0.5 gram per liter.

The media were separately inoculated both with *Penicillium chrysogenum* Demerec X1612 and *Penicillium chrysogenum* Wisconsin Q176 and the microorganism propagated therein for a period up to 6 days. At the end of 3 days, 4 days, and 6 days, in each case, the penicillin potency was determined by bioassay. The values of penicillin potency given in the table are in Oxford units per milliliter. It will be observed that the penicillin potency was much higher when the microorganism was propagated in nutrient media containing cottonseed meal, as compared with the usual commercially used nutrient medium containing corn steep solids.

by weight, based on the total weight of the medium:

Calcium carbonate 1%
Cottonseed meal 4%
Lactose 3%
Phenylacetylethanolamine 0.05%
Castor oil (antifoam agent) 100 milliliters
Tap water balance The batch was sterilized for ½ hour at 120° C. After cooling to 25° C. it was inoculated with 30 liters of vegetative growth of *Penicillium chrysogenum* X1612 from a 48-hour old batch which

| Medium | Grams per liter | P. chrysogenum Demerec X1612 | | | | P. chrysogenum Wisconsin Q176 | | | |
|---|---|---|---|---|---|---|---|---|---|
| | | 3 days | 4 days | 5 days | 6 days | 3 days | 4 days | 5 days | 6 days |
| Corn steep solids | 20 | 140 | 180 | 200 | 120 | 375 | 550 | 650 | 600 |
| Lactose | 30 | | | | | | | | |
| Calcium carbonate | 10 | | | | | | | | |
| Corn steep solids | 20 | 160 | 250 | 350 | 300 | 1,050 | 1,300 | 1,260 | 900 |
| Lactose | 30 | | | | | | | | |
| Calcium carbonate | 10 | | | | | | | | |
| Phenylacetyl derivatives | 0.5 | | | | | | | | |
| Cottonseed meal | 40 | 190 | 250 | 300 | 175 | 520 | 800 | 950 | 1,000 |
| Lactose | 30 | | | | | | | | |
| Calcium carbonate | 10 | | | | | | | | |
| Cottonseed meal | 40 | 160 | 270 | 320 | 200 | 540 | 950 | 1,160 | 885 |
| Lactose | 30 | | | | | | | | |
| Calcium carbonate | 10 | | | | | | | | |
| Phenylacetyl derivatives | 0.5 | | | | | | | | |

It might be noted that a nutrient medium containing 2% of corn steep solids was found, by experiment to give the optimum results in penicillin production when corn steep liquor was utilized as the principal constituent of the nutrient medium in which the microorganism was propagated.

*Example 2*

300 liters of a nutrient medium of the following composition was prepared in a hundred gallon carbon steel fermenter. The percentages are by weight, based on the total weight of the nutrient medium:

Cottonseed meal 4%
Lactose USP 3%
Sodium nitrate USP 0.3%
Castor oil (antifoam agent) 100 milliliters
Phenylacetylethanolamine 0.05%
Tap water balance The batch was first sterilized by heating at 125° C. for ½ hour. It was then cooled to 25° C. and inoculated with 30 liters of vegetative growth from a 48-hour old batch of *Penicillium chrysogenum* X1612 which had been cultivated on the same medium. The medium was continuously agitated and aerated by a propeller at 210 R. P. M. During the propagation period 1000 C. F. H. of sterile air was blown through the growing mold and medium.

Samples of the broth were withdrawn periodically under aseptic conditions and assayed to determine their penicillin content. The maximum activity was found to be 381 Oxford units per milliliter after 56 hours growth. This is an average rate of 6.8 units of penicillin per milliliter of broth per hour of growth.

*Example 3*

300 liters of a nutrient medium having the following composition was made up in a 100 gallon carbon steel fermenter. The percentages are had been cultivated on the same medium. The medium was continuously agitated by propeller at 210 R. P. M. and aerated with 1000 cubic feet per hour of sterile air.

Samples were withdrawn periodically under aseptic conditions and assayed to determine their penicillin content. The maximum activity was 293 Oxford units per milliliter after 56 hours growth. This is an average rate of 5.2 units of penicillin per milliliter of broth per hour of growth.

*Example 4*

300 liters of medium having the following composition was made up in a 100 gallon carbon steel fermenter. All percentages are by weight, based on the total weight of the medium:

Corn steep liquor 4% of solids
Lactose 3%
Calcium carbonate 1%
Phenylacetylethanolamine 0.05%
Castor oil (antifoam agent) 100 milliliters
Tap water balance The batch was sterilized for ½ hour at 120° C. After cooling to 25° C., the batch was inoculated with 30 liters of vegetative growth of *Penicillium chrysogenum* X1612 from a 48-hour old batch cultivated on the same medium. The medium was continuously agitated at 150 R. P. M. and aerated with 1000 cubic feet per hour of sterile air. Samples of the nutrient medium were withdrawn periodically under aseptic conditions and assayed for penicillin content. The maximum activity was found to be 175 Oxford units per milliliter of nutrient medium at 106 hours growth. This is an average rate of 1.7 units of penicillin per milliliter per hour.

As a commercial product for use in the manufacture of penicillin by the growth of Penicillia producing penicillin, cottonseed meal had the advantage of uniformity, as contrasted with other media which vary greatly in their characteristics. Moreover cottonseed meal is a dry bulk material and is more easily handled than the type of nutrient media which is supplied commercially in the form of thick viscous syrups.

Various changes and modifications might be made in our invention as described without departing from the scope thereof. Accordingly, to the extent that these changes and modifications are within the scope of the appended claims, they are to be considered as part of our invention.

We claim:

1. The process for the production of penicillin which comprises propagating a penicillin-producing strain of a mold belonging to the genus Penicillium in an aqueous medium containing cottonseed meal under aerobic submerged conditions, the pH of said aqueous medium, during said propagation, falling within the range 6.0 to 8.5.

2. The process for the production of penicillin which comprises propagating a penicillin-producing strain of a mold belonging to the genus Penicillium in a nutrient medium containing cottonseed meal and a source of carbon and energy selected from the group consisting of carbohydrates, glycerol, and mixtures thereof.

3. The process for the production of penicillin which comprises propagating a penicillin-producing strain of a mold belonging to the genus Penicillium in an aqueous nutrient medium comprising cottonseed meal, a source of carbon and energy selected from the group consisting of carbohydrates, glycerol, and mixtures thereof, and an inorganic salt selected from the group consisting of sodium nitrate, calcium carbonate, ammonium phosphate, magnesium sulfate, zinc sulfate, and mixtures thereof.

4. The process for the production of penicillin which comprises propagating a penicillin-producing strain of *Penicillium notatum* in an aqueous medium containing cottonseed meal under aerobic submerged conditions, the pH of said aqueous medium, during said propagation, falling within the range 6.0 to 8.5.

5. The process for the production of penicillin which comprises propagating a penicillin-producing strain of *Penicillium notatum* in a nutrient medium containing cottonseed meal and a source of carbon and energy selected from the group consisting of carbohydrates, glycerol, and mixtures thereof.

6. The process for the production of penicillin which comprises propagating a penicillin-producing strain of *Penicillium notatum* in an aqueous nutrient medium comprising cottonseed meal, a source of carbon and energy selected from the group consisting of carbohydrates, glycerol, and mixtures thereof, and an inorganic salt selected from the group consisting of sodium nitrate, calcium carbonate, ammonium phosphate, magnesium sulfate, zinc sulfate, and mixtures thereof.

7. The process for the production of penicillin which comprises propagating a penicillin-producing strain of *Penicillium chrysogenum* in an aqueous medium containing cottonseed meal under aerobic submerged conditions, the pH of said aqueous medium, during said propagation, falling within the range 6.0 to 8.5.

8. The process for the production of penicillin which comprises propagating a penicillin-producing strain of *Penicillium chrysogenum* in a nutrient medium containing cottonseed meal and a source of carbon and energy selected from the group consisting of carbohydrates, glycerol, and mixtures thereof.

9. The process for the production of penicillin which comprises propagating a penicillin-producing strain of *Penicillium chrysogenum* in an aqueous nutrient medium comprising cottonseed meal, a source of carbon and energy selected from the group consisting of carbohydrates, glycerol, and mixtures thereof, and an inorganic salt selected from the group consisting of sodium nitrate, calcium carbonate, ammonium phosphate, magnesium sulfate, zinc sulfate, and mixtures thereof.

10. The process for the production of penicillin which comprises propagating a penicillin-producing strain of a mold belonging to the genus Penicillium in an aqueous medium containing cotton seed meal, lactose, sodium nitrate, castor oil, and phenylacetyl ethanolamine, under aerobic submerged conditions, the pH of said aqueous medium, during said propagation, falling within the range 6.0 to 8.5.

11. The process for the production of penicillin which comprises propagating a penicillin-producing strain of a mold belonging to the genus Penicillium in an aqueous medium containing cottonseed meal, lactose, calcium carbonate, castor oil, and phenylacetyl ethanolamine, under aerobic submerged conditions, the pH of said aqueous medium, during said propagation, falling within the range 6.0 to 8.5.

12. The process for the production of penicillin which comprises propagating a penicillin-producing strain of a mold belonging to the genus Penicillium in an aqueous medium containing cotton seed meal, lactose, sodium nitrate, calcium carbonate, castor oil, and phenylacetyl ethanolamine, under aerobic submerged conditions, the pH of said aqueous medium during said propagation, falling within the range 6.0 to 8.5.

JACKSON W. FOSTER.
LLOYD E. McDANIEL.